United States Patent [19]

Boer et al.

[11] Patent Number: 5,338,768
[45] Date of Patent: Aug. 16, 1994

[54] SUBSTANTIALLY CLOSED CELL RIGID POLYURETHANE FOAMS

[75] Inventors: Jelle D. Boer, Coye-la-Foret; Bernard Auguet, Pont Ste Maxence, both of France

[73] Assignee: Arco Chemical Technology, L.P., Wilmington, Del.

[21] Appl. No.: 943,995

[22] Filed: Sep. 11, 1992

Related U.S. Application Data

[63] Continuation of Ser. No. 413,367, Sep. 27, 1989, abandoned.

[30] Foreign Application Priority Data

Jun. 10, 1988 [GB] United Kingdom ............. 8823528.8

[51] Int. Cl.$^5$ .............................................. C08G 18/32
[52] U.S. Cl. ................... 521/164; 252/182.24; 252/182.26; 252/182.27; 428/290; 428/423.1; 428/314.4; 428/316.6; 521/116; 521/167; 521/172; 521/174; 568/700; 568/704
[58] Field of Search .............. 428/314.4, 316.6, 319.1, 428/305.5, 290, 423.1; 521/106, 172, 174, 167, 116, 131, 107, 164; 568/700, 704; 252/182.24, 182.26, 182.27

[56] References Cited

U.S. PATENT DOCUMENTS

| | | | |
|---|---|---|---|
| 3,297,597 | 1/1967 | Edwards et al. | 521/166 |
| 3,436,373 | 4/1969 | Cox et al. | 521/106 |
| 4,121,958 | 10/1978 | Koonts | 428/305.5 |
| 4,163,086 | 7/1979 | Narayan et al. | 521/131 |
| 4,351,873 | 9/1982 | Davis | 428/198 |
| 4,362,823 | 12/1982 | Wernsing | 521/116 |
| 4,374,209 | 2/1983 | Rowlands | 521/116 |
| 4,680,214 | 7/1987 | Frisch et al. | 521/173 |
| 4,781,774 | 11/1988 | Steward et al. | 428/316.6 |
| 4,940,047 | 7/1990 | Richter et al. | 428/290 |
| 4,940,632 | 7/1990 | Nicola et al. | 428/319.1 |
| 5,013,766 | 5/1991 | Hanusa | 521/172 |

FOREIGN PATENT DOCUMENTS 1061210 3/1967 United Kingdom .

OTHER PUBLICATIONS

"Advances in Technology and Uses of Rigid Urethane Foams"; Frisch et al. (Modern Plastics 40, 165 (Oct. 1962)).

*Primary Examiner*—John Kight, III
*Assistant Examiner*—John M. Cooney, Jr.

[57] ABSTRACT

Substantially closed cell rigid polyurethane foam cores of laminates are disclosed which are scorch-free, have a density of 50 kg/m$^3$ and are made using water as the sole or main blowing agent and without the need to use a CFC. The foams are prepared from polyol compositions comprising the product of alkoxylating an initiator having a functionality of more than 2, at least one aromatic ring and at least one amino nitrogen atom. The initiator is preferably a Mannich condensate of a phenolic compound, formaldehyde and ammonia or an alkanolamine and the polyol is preferably used together with a second polyol having a functionality (or average functionality) of at least 1 but less than 3 and a molecular weight $M_w$ (or average molecular weight) of 250 to 4000.

23 Claims, No Drawings

SUBSTANTIALLY CLOSED CELL RIGID POLYURETHANE FOAMS

This is a continuation of copending application Ser. No. 07/413,367 filed on Sep. 27, 1989, now abandoned.

This invention relates to substantially closed cell rigid polyurethane foams especially for use as the cores of laminates, to polyol compositions suitable for use in the formation of the foams and to a method of obtaining the foams.

Rigid polyurethane foam is widely used in the core of laminates to provide insulation. The term laminates, as used herein, includes both laminates obtained by pour-in-place techniques and panel laminates e.g. of the kind formed on double band lamination machines. An example of the former is refrigerator cabinet insulation where the foam is formed in place by pouring a suitable foam-forming composition between the inner and outer walls of the cabinet and allowing the composition to rise and set in situ. Examples of the latter are panel laminates such as laminated board or metal faced panels employed in the construction of cold boxes and the like. In one method of forming this latter kind of laminate, the foam-forming composition is deposited on the face of the upper or lower of the sheets with which it is to form the laminate and then passed with the sheets between the bands of a double band lamination machine where it is caused or allowed to foam and set in contact with the surfaces of the sheets.

For use in these laminates, the foams are required to be substantially closed cell, in order to have the desired insulation properties, and of low density e.g. 50 kg/m$^3$ or lower, and to have good physical properties such as compressive strength, shear strength and tensile strength. The foams must also exhibit good adhesion to a variety of substrates. The compositions from which the foams are formed must have a suitable viscosity and appropriate cream times, gel times and tack-free times.

The foams are prepared commercially from a foam-forming composition obtained by mixing a polyol component with a polyisocyanate component in the presence of a blowing agent and usually also a catalyst and a surfactant. The blowing agent is usually incorporated with the polyol prior to mixing with the polyisocyanate. Conventionally, the blowing agent is selected from chlorofluorocarbons (CFCs), particularly CFC 11, and its inclusion in the polyol component is frequently an important aid to reducing the viscosity of the component to an acceptable level. Despite increasing pressure on manufacturers to find an alternative to the use of CFCs because of the strengthening belief that their emission to the atmosphere are harmful, hitherto no acceptable alternative has been developed.

Water is also known as a blowing agent for the production of polyurethane foams; it reacts with isocyanate groups in the polyurethane-forming mixture to produce carbon dioxide which effects the foaming. In the production of rigid foams, water has been used successfully as the sole blowing agent in the production of low grade open-celled foams of low density such as are used in flower-arranging; however these foams have very poor physical properties, especially very poor compressive strength and high friability, and their insulation properties are also poor. Water is also used to boost blowing by CFCs in the production of substantially rigid closed cell polyurethane foams having a density of 50 kg/m$^3$ or less; however in conventional systems the water can only be tolerated in very small amounts e.g. up to 5 parts by weight maximum per 100 parts by weight of CFC 11, because of the difficulty of controlling the exotherm with larger amounts. If the exotherm is not controlled properly, scorched foams result.

Substantially closed cell rigid polyurethane foams have also been prepared using water as the main or sole blowing agent but their densities are in the range 60 to 300 kg/m$^3$.

U.S. Pat. No. 3,094,434 describes polyurethane foam-forming formulations for spray-on applications wherein water is the blowing agent and the polyol component comprises a hydroxyl terminated polyether containing tertiary amino groups. The polyether is employed alone or in admixture with a major amount of a trifunctional polyether or a minor amount of an ethoxylated cetyl alcohol/oleyl alcohol mixture. Laminates are not described.

U.S. Pat. No. 3,194,773 describes the production, using water as the blowing agent, of polyurethane foams having a density less than 50 kg/m$^3$ for use as e.g. crash pads for automobiles, bed pillows, upholstery, mattresses and the like. Such foams will not be rigid.

U.S. Pat. No. 4,575,520 describes the formation of laminates with a rigid closed cell polyurethane foam having a density in the range 36-38 kg/m$^3$ from a polyol component comprising sucrose polyether and propoxylated ethylene diamine. However, the foam-forming composition includes substantial amounts of monofluorotrichloromethane (CFC 11) as blowing agent.

U.S. Pat. No. 3,297,597 describes the production of rigid polyurethane foams using a polyol obtained by alkoxylating a Mannich condensation product of a phenol, formaldehyde and an alkanolamine. Trichlorofluoromethane is employed as the blowing agent in all examples.

GB-A-1061210 describes polyols obtained by alkoxylating the product of condensing an aromatic amine or phenol with formaldehyde and a primary amine and their use in the formation of polyurethane foams having a density of less than 50 kg/m$^3$. The nitrogen-containing polyols are used in admixture with trifunctional polyols and the formation of laminates is not described.

GB-A-1138973 also described nitrogen-containing polyols obtained by alkoxylating the product of condensing phenol, formaldehyde and a primary amine and their use in the formation of polyurethane foams. The nitrogen-containing polyols are used in admixture with polyols having a functionality of at least 3 and trichloromonofluoromethane is employed as blowing agent in all the examples.

We have now developed a laminate having a polyurethane foam core comprising substantially closed cell rigid polyurethane foam made using a blowing agent consisting mainly or entirely of water, and which is scorch-free and has a density of 50 kg/m$^3$ or less.

In the field of polyurethane foams, blowing agents are compared in terms of their equivalent blowing capacity; that is the amount of blowing agent of one kind required to give the same degree of volume expansion of a specified polyurethane-foaming mixture as a given amount of another blowing agent. By a blowing agent consisting mainly of water we mean that the amount of other blowing agent present, if any, is less than its equivalent of the amount of water present, in terms of blowing capacity. For example 1 part by weight of water has the equivalent blowing capacity of about 10 parts by weight of CFC 11. Thus if CFC 11 is used in conjunction with water the weight ratio of water to CFC 11 must be greater than 1:10. In general it will be at least 1:7 and we have obtained satisfactory results at 1:5 and lower, down to 1:0. Preferably the blowing agent is substantially free of chlorofluorocarbon.

Preferably the foam core of the laminate has a density in the range 35 to 50 kg/m$^3$. By density, we mean the overall average density of the foam.

The foam may be obtained using a particular kind of polyol, namely a polyol prepared by reacting an alkylene oxide with an initiator having a functionality greater than 2 and having at least one aromatic ring and at least one amino nitrogen atom. With the use of such polyols, and using only water as the blowing agent, we have been able to produce laminates with scorch-free substantially closed cell rigid polyurethane foam cores having densities of 50 kg/m$^3$ or less and physical properties which are generally similar to those of conventional CFC-blown foams of corresponding density. In addition, the processing characteristics such as cream time, gel time and tack-free time are comparable with CFC-blown foams and so is the level of adhesion to substrates such as metal, paper and board. The thermal conductivities of the foams are unexpectedly lower (i.e. insulation properties are better) than would be expected from the values obtained with the known foams of higher density made using water as the sole blowing agent.

Preferably, the amino nitrogen atom of the initiator will have at least one substituent containing a primary and/or secondary hydroxyl group and the nitrogen will be attached to the aromatic ring by an alkylene group, preferably a methylene group.

Preferred examples of the polyols are those derived by reaction of one or more alkylene oxides with Mannich reaction products obtained by the reaction of at least one phenolic compound with formaldehyde and a nitrogen compound. Most preferably, the nitrogen compound is selected from ammonia, alkanolamines and mixtures thereof, such as are described in British Patent Specifications Nos. 1.002.272. and 2.114.138, since they enable the ready production of polyols having sufficiently low viscosities to be useful in polyol compositions without the presence of a viscosity-reducing CFC.

The phenolic compound to be employed in the Mannich condensation is an aromatic compound containing one or more hydroxyl groups attached directly to the aromatic nucleus and having a hydrogen atom on one or more of the ring positions ortho and para to the hydroxyl group and which is otherwise unsubstituted or substituted with substituent groups which are non-reactive under Mannich reaction conditions. Substituent groups that may be present include alkyl, cycloalkyl, aryl, halo, nitro, carboalkoxy, haloalkyl, and hydroxyalkyl. The phenolic compound preferably has a molecular weight within the range of from 94 to 500. Examples of acceptable phenolic compounds include phenol, o-, m-, or p-cresols, ethylphenol, nonylphenol, p-phenylphenol, 2,2-bis(4 hydroxyphenyl)-propane, β-naphthol, β-hydroxyanthracene, p-chlorophenol, o-bromophenol, 2,6-dichlorophenol. p-nitrophenol, 4-nitro-6-phenylphenol, 2-nitro-4-methylphenol, 3,5-dimethylphenol, p-isopropylphenol, 2-bromo-4-cyclohexylphenol, 2-methyl-4bromophenol, 2-(2-hydroxypropyl)phenol, 2-(4-hydroxyphenyl)ethanol.

The preferred phenolic compounds are phenol and monoalkyl substituted phenols, especially nonylphenol.

While ammonia may also be used, the nitrogen-containing component to be reacted with the phenolic compound and formaldehyde in the Mannich reaction is preferably selected from alkanolamines. The alkanolamines preferably have the formula:

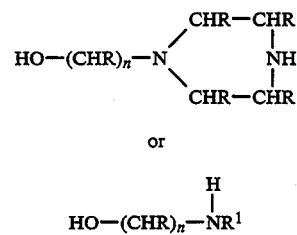

or $$HO-(CHR)_n-NR^1 \atop H$$

where each R is selected from hydrogen and C$_1$-C$_4$ alkyl, R$^1$ is selected from hydrogen, C$_1$-C$_4$ alkyl and —(CHR)$_n$—OH, and n is a positive integer having a value of two to five. Where the compound contains more than one —CHR— group, the nature of R may vary from group to group.

Examples of suitable alkanolamines that may be used are monoethanolamine, diethanolamine, isopropanolamine, bis(2-hydroxypropyl) amine, hydroxyethylmethylamine, N-hydroxyethylpiperazine, N-hydroxypropylpiperazine, N-hydroxybutylamine, N-hydroxyethyl-2,5-dimethylpiperazine. Secondary alkanolamines are preferred because the Mannich condensates formed from them are more readily alkoxylated to produce polyols having the desired low level of viscosity. Diethanolamine is particularly preferred.

Formaldehyde may be employed in the Mannich reaction in any of its conventional forms, such as an aqueous formalin solution, an "inhibited" methanol solution, paraformaldehyde or trioxane.

The alkylene oxide to be reacted with the initiator to form the polyol is preferably propylene oxide or a mixture thereof with ethylene oxide but other examples are butylene oxide and cyclohexene oxide. Other mixtures of alkylene oxides may also be used.

The characteristics of the polyol may be varied over wide limits by choice of phenolic compound, alkanolamine and alkylene oxide and by varying the molar ratios of the reactants; that is the molar ratios of phenolic compound, alkanolamine and formaldehyde employed to form the initiator and the molar ratio of alkylene oxide to initiator. However, the preferred polyols have a nitrogen content of from 1 to 15% by weight, more preferably 4 to 8%, by weight with the nitrogen being present as secondary or tertiary nitrogen, in the form of 1 to 3 N-substituted aminomethyl groups attached to an aromatic nucleus to which is also attached at least one hydroxyalkyl group derived from alkylene oxide. At least one of the substituents on the nitrogen atom of the or each N-substituted aminomethyl group will normally contain a primary or secondary hydroxyl group. Generally, the hydroxyl number of the polyol will be in the range 300 to 900, and preferably the hydroxyl number will be in the range 300 to 600 mg KOH/g. While polyols having a functionality of as much as 7 may be obtained, preferably the functionality is in the range of 3 to 5.

In the formation of the Mannich product, it is generally preferred to avoid those conditions, such as the use of excess formaldehyde, which may lead to the formation of polymethylene derivatives of phenol by the Novolak reaction.

One class of polyols particularly preferred for use in the present invention comprises those obtained by forming a Mannich product by reaction of the phenolic compound, alkanolamine (or ammonia) and formaldehyde in a molar ratio of phenol:alkanolamine (or ammonia) of substantially 1:2 and a molar ratio of formaldehyde:-phenolic compound of from 1.25:1 to 1.75:1 and heating the mixture at a temperature of from 50° C. to 150° C. until the formaldehyde content thereof is no more than 1 wt %, stripping water from the resulting condensation product, and reacting the stripped condensation product at a temperature of from 30° to 200° C. with at least two alkylene oxides selected from ethylene oxide, propylene oxide, butylene oxide, styrene oxide and glycidol.

Further details of this method and preferred embodiments thereof are found in British Patent Specification No. 2.114.138.

In accordance with one embodiment of the invention, the above described polyol may be employed as the sole polyol component in the production of the foam. However, a combination of viscosity and reactivity which facilitates processing on conventional high and low pressure polyurethane foam dispensing equipment is more readily achieved if the polyol is used in combination with at least one other organic hydroxy compound which will normally be present in a minor amount.

Thus, the invention also provides a composition suitable for use in the polyurethane foam-forming mixture, said composition (hereinafter referred to as the polyol composition) comprising at least one first component selected from polyols of the kind described above, that is, prepared by reacting at least one alkylene oxide with an initiator having a functionality of more than 2, at least one aromatic ring and at least one amino nitrogen atom, and at least one second component selected from monohydroxy organic compounds, polyols, and mixtures thereof, the functionality or average functionality of said second component being at least 1 but less than 3 and the molecular weight ($M_w$) or average molecular weight of said component being in the range 250 to 4000. The first and second component must be chosen such that the overall functionality of the composition is more than 2 and preferably the second component is less reactive than the first.

When such an admixture is used, it is preferred that the polyol employed as the first polyol component have a functionality of least 3, and preferably 3 to 5, and an OH number in the range 300 to 600.

Monohydroxy compounds preferred for use as, or as part of, the second component are alkoxylated monohydric phenolic compounds such as alkoxylated monoalkyl phenols e.g. alkoxylated nonyl phenol. The alkoxylating agent is preferably ethylene oxide and/or propylene oxide.

Polyols that may be used as or in the second component are those of the kind known for use in the production of polyurethanes. Preferably, however, where said second component comprises polyol, it consists essentially of polyether polyol; that is, it is free or substantially free of polyester polyol. For optimum reactivity of the polyol composition, it is also preferred that said second component is free or substantially free of primary hydroxy groups where it is a polyol.

Most preferably the second component has a functionality of about 2 and preferred examples of polyols that may be used are propoxylated diols such as propoxylated propylene glycol or propoxylated poly(propylene glycols) e.g. as in propoxylated derivatives of dipropylene glycol or tripropylene glycol.

In general, if the molecular weight, or average molecular weight, of the second component is below 250, the hydroxyl number of the polyol mixture will be too high but if it is above 4000, the viscosity of the polyol mixture may tend to be too high for use on conventional equipment. Preferably the molecular weight, or average molecular weight, will be in the range 400 to 4000.

Preferably, the second component of the polyol composition forms 1 to 40%, and more preferably from 15 to 25% by weight, of the total of the polyol composition.

So that the polyol composition may be employed in conventional polyurethane foam dispensing equipment and using conventional processing procedures, it is desirable that when mixed together with conventional additives such as catalyst (if used), surfactant and/or fire retardant, to form what is known as the B component, the viscosity of the resultant mixture is less than 1000 mPa.s. In general, the viscosity of the first polyol will be in the range 3 500 to 20 000 cps but is preferable below 15 000 cps. The viscosity of the second polyol must normally be less than that of the first. Generally, it will be less than 1 500 cps and preferably less than 1 000 cps.

The substantially closed cell rigid polyurethane foam laminate cores of the invention having a density of 50 kg/m$^3$ or less are prepared by reacting the polyol or polyol composition with polyisocyanate in the presence of a blowing agent which consists mainly or entirely of water. The polyisocyanates, which will generally have a functionality of about 2, may be aromatic or aliphatic but best results are obtained using polymethylene polyphenylisocyanates having a functionality in the range 2.1 to 3.2, preferably 2.5 to 3.2, and an equivalent weight in the range 120 to 180, preferably 130 to 145. Such isocyanates are available commercially as MDI.

In general the polyisocyanate will be employed in an amount to provide an isocyanate index of about 100 to 120 (i.e. from stoichiometric to about 1.2 times stoichiometric). However, higher indices may also be used, leading to isocyanurate-modified polyurethane foams, which foams are also included in the term "polyurethane foam" as it is used herein.

The amount of water required to yield a foam having a density of 50 kg/m$^3$ or less will vary with the nature of the polyol and polyisocyanate but will generally be in the range 1 to 5% by weight based on the weight of polyol or polyol composition. The water may be used in conjunction with a minor amount (in the sense of equivalent blowing capacity) of other blowing agent such as CFC but for environmental and cost reasons it is preferred that the blowing agent consist entirely or substantially entirely of water. Surprisingly, foams that are comparable with those obtained using CFCs in both processing and physical properties, and also in adhesion to substrates, can be obtained using water as the sole blowing agent.

The foams may be prepared by the one-shot or two-shot method. Where a prepolymer of isocyanate and polyol is formed, which is then reacted with more polyol, it is preferred to employ the polyol composition of the kind described above, to use a polyol as, or as part of, the second component of the composition, and to employ said polyol in the formation of the prepolymer.

Other additives conventionally employed in the production of substantially closed cell rigid polyurethane foams may be included in the foam-forming formulations, e.g. catalysts, foam stabilisers and fire retardants. In the production of conventional substantially closed cell rigid polyurethane foams having densities of 50 kg/m$^3$ or less, the beneficial viscosity-reducing effect of the CFC employed as blowing agent is also made use of. Accordingly, where, as in the present invention, substantially less or no CFC is employed, it may be found desirable to include other compounds having a viscosity reducing effect. It is particularly preferred to use a compound having both a fire retardant and a viscosity reducing effect. Preferred examples are alkyl phosphates and phosphonates, especially dimethyl methylphosphonate (DMMP) and triethylphosphate (TEP). An unexpected benefit of the invention, however, is that with the preferred polyol compositions less of the fire retardant is required to achieve a desired level of fire retardancy, as compared with conventional rigid polyurethane foam formulations. The amount of fire retardant employed will depend on the nature of the polyol composition and the desired viscosity; however in general it should not exceed 20 parts per 100 parts of polyol, by weight, since otherwise the physical properties of the foam may be adversely affected. In general, the amount employed will be about 5 to 15 parts per 100 parts of polyol, by weight.

While the polyol compositions referred to above are particularly suitable for use in the production of rigid substantially closed cell low density polyurethane foam cores in laminates such as produced by in situ insulation between the inner and outer walls of refrigerator cabinets or the production of double band laminates such as laminated board, they may also be used in the production of other polyurethane foams such as free rise foams and/or those having a density above 50 kg/m$^3$ and/or made by a process in which water provides only a minor contribution to the blowing, or none at all.

The invention is now illustrated but is no way limited by the following Examples in which all parts are expressed as parts by weight except where otherwise indicated.

EXAMPLES 1–4

A series of rigid substantially closed cell polyurethane foams were prepared from the formulations given in the Table below by mixing the polyisocyanate with a pre-formed composition containing all the remaining components at ambient temperature, pouring the mixture into an open box mould (20 cm×20 cm×20 cm) and allowing the composition to rise and set. The foam exotherm, cream time, gel time, tack free time and properties of the foam are recorded in the Table.

ARCOL 3750 is a polyol having an OH number of 530 mgKOH/g and a functionality of 3 and is a propoxylated Mannich condensation product of phenol, formaldehyde and diethanolamine.

ARCOL 1004 is a polyol having an OH number of 260 mgKOH/g and a functionality of 2 and is a propoxylated dipropylene glycol.

ARCOL 1010 is a propoxylated propylene glycol having a functionality of 2, a molecular weight of 1050 and an OH number of 107 mgKOH/g.

ARCOL 3637 is a propoxylated sucrose-triethanolamine adduct with a typical OH number of 580 mgKOH/g.

SURFONIC N 120 is an ethoxylated nonyl phenol having an OH number of 100 mgKOH/g and containing about 12 moles ethylene oxide per mole of nonyl phenol.

POLYOL A is a propoxylated Mannich condensation product of nonyl phenol, formaldehyde and diethanolamine having an OH number of 360 mgKOH/g, a functionality of 3 and a viscosity at 25° C. of 7600 mPa.s.

|  | Example 1 | Example 2 | Example 3 | Example 4 | Comparative Example 1 | Comparative Example 2 |  |
| --- | --- | --- | --- | --- | --- | --- | --- |
| ARCOL 3750 | 72.8 | 72.8 | 80 | — | 88 | — | pbw |
| Surfonic N120 | 18.2 | — | — | — | — | — | pbw |
| ARCOL 1004 | — | — | 20 | — | — | 17.6 | pbw |
| ARCOL 3637 | — | — | — | — | — | 70.4 | pbw |
| ARCOL 1010 | — | 18.2 | — | — | — | — | pbw |
| POLYOL A | — | — | — | 100 | — | — | pbw |
| dmmp$^{(1)}$ | 9 | 9 | 15 | 15 | 12 | 12 | pbw |
| Water | 2.5 | 2.5 | 3.8 | 3.8 | 0.5 | 2.5 | pbw |
| dmcha$^{(2)}$ | 0.4 | 0.6 | 0.7 | 0.5 | 0.8 | 0.7 | pbw |
| Tegostab 8404 | 1 | 1 | 1.5 | 1.5 | 1 | 1 | pbw |
| Flurocarbon CFC 11 | — | — | — | — | 15.7 | — | pbw |
| Polymeric MDI (Index 110) | 150 | 150 | 189 | 159 | 132 | 162 | pbw |
| Cream time | 19 | 19 | 16 | 14 | 21 | 20 | sec |
| Gel time | 40 | 41 | 40 | 40 | 44 | 43 | sec |
| Tack free time | 64 | 64 | 59 | 68 | 60 | 67 | sec |
| Foam core density | 46 | 46 | 36 | 36 | 46 | 47 | kg/m$^3$ |
| Foam exotherm | 196 | 195 | 190 | 178 | 174 | 191 | °C. |
| Compressive strength |  |  |  |  |  |  |  |
| parallel to rise | 270 | 254 | 203 | 187 | 390 | 290 | kPa |
| perpendicular 1 to rise | 160 | 168 | 88 | 92 | 186 | 175 | kPa |
| perpendicular 2 to rise | 150 | 113 | 90 | 96 | 183 | 155 | kPa |
| Lambda value | 25.8 | 25.9 | 26.3 | 26 | 19.8 | 26.8 | mW/mk |
| Fire Resistance DIN 1102 B2 | 12 | 13 | 9 | 10 | 11 | 17 | cm |

$^{(1)}$dimethyl methylphosphonate
$^{(2)}$dimethylcyclohexylamine

EXAMPLE 5

Example 3 was repeated but with varying amounts of water. The densities of the resultant foams are recorded below

| Water (Parts by Weight) | Density (kg/m$^3$) |
| --- | --- |
| 2.4 | 49.6 |

-continued

| Water (Parts by Weight) | Density (kg/m³) |
|---|---|
| 2.6 | 44.5 |
| 2.8 | 42 |
| 3.0 | 39.7 |
| 3.2 | 37 |

EXAMPLE 6

Example 3 was repeated but with varying amounts of catalyst (dimethylcyclohexylamine). The densities of the resultant foams are recorded below.

| Concentration of Catalyst (parts by Weight) | Density (kg/m³) |
|---|---|
| 0.4 | 48 |
| 0.9 | 44.4 |
| 1.4 | 41 |
| 1.9 | 9 |

EXAMPLE 7

The polyol composition of Example 3 was employed in the production of a laminate between two corrugated steel sheets using a conventional high pressure polyurethane foam dispenser. The details of the foam-forming formulation and the properties of the resultant laminates are given in the Table below.

| | | |
|---|---|---|
| POLYOL COMPOSITION | 100 | pbw |
| DMMP | 15 | pbw |
| TEGOSTAB B8404 | 1.5 | pbw |
| WATER | 3.5 | pbw |
| DMCHA | 0.6 | pbw |
| POLYMERIC MDI | 181 | pbw |
| PANEL THICKNESS: 45 mm | | |
| DENSITY | 50 | kg/m³ |
| COMPRESSIVE STRENGTH PARALLEL TO RISE | 330 | kPa |
| TENSILE STRENGTH NFT 56 102 | 220 | kPa |
| SHEAR STRENGTH NFT 56 130 | 200 | kPa |
| Flame Height DIN 4102 B2 | 11–12 | cm |
| LAMBDA VALUE 24° C. AFTER 1 WEEK DIN 52 612 | 23.7 | mW/m K |

What is claimed is:

1. A laminate comprising a polyurethane foam core in which the polyurethane foam is a closed cell rigid polyurethane foam made using water as the sole blowing agent, which polyurethane foam is prepared from a polyol composition having a functionality greater than 2, and comprising at least one first component (1) which is prepared by reacting alkylene oxide with an initiator having a functionality of more than 2, at least one aromatic ring, and at least one amino nitrogen atom, where the viscosity of the first component is in the range of 3,500 to 20,000 cps at about 25° C.; and at least one second component (2) selected from the group consisting of monohydroxy organic compounds, polyols, and mixtures thereof, said second component having a functionality or average functionality of at least 1 but less than 3 and a molecular weight ($M_w$) or average molecular weight in the range of 250 to 4,000, said second component being free of polyester polyol and having a viscosity less than that of the first component at about 25° C.; and which closed cell rigid polyurethane foam is scorch-free and has a density not greater than about 50 kg/m³.

2. The laminate of claim 1 wherein said initiator comprises a Mannich condensation product of at least one phenolic compound, formaldehyde, and a nitrogen-containing component selected from the group consisting of ammonia, alkanolamines and mixtures thereof.

3. A closed cell rigid polyurethane foam which is scorch-free and has a density of not greater than 50 kg/m³ and is prepared using water as the sole blowing agent and from a polyol composition having a functionality greater than 2, and comprising at least one first component (1) prepared by reacting alkylene oxide with an initiator comprising a Mannich condensation product of at least one phenolic compound, formaldehyde, and a nitrogen-containing component selected from the group consisting of ammonia, alkanolamines and mixtures thereof, where the viscosity of the first component is in the range of 3,500 to 20,000 cps at about 25° C.; and at least one second component (2) selected from the group consisting of monohydroxy organic compounds, polyols, and mixtures thereof, said second component having a functionality or average functionality of at least 1 but less than 3 and a molecular weight ($M_w$) or average molecular weight in the range of 250 to 4,000, said second component being free of polyester polyol and having a viscosity less than that of the first component at about 25° C.

4. A polyol composition suitable for use in the production of polyurethane foam, said composition having an overall functionality of more than two and comprising at least one first component (1) prepared by reacting alkylene oxide with an initiator having a functionality of more than 2, at least one aromatic ring, and at least one amino nitrogen atom, where the viscosity of the first component is in the range of 3,500 to 20,000 cps at about 25° C., and at least one second component (2) selected from the group consisting of monohydroxy organic compounds, polyols, and mixtures thereof, said second component having a functionality or average functionality of at least 1 but less than 3 and a molecular weight ($M_w$) or average molecular weight in the range of 250 to 4,000, said second component being free of polyester polyol and having a viscosity less than that of the first component at about 25° C.

5. The polyol composition of claim 4 wherein said at least one first component is an adduct of alkylene oxide and a Mannich condensation product of at least one phenolic compound, formaldehyde, and a nitrogen-containing component selected from the group consisting of ammonia, alkanolamines, and mixtures thereof.

6. The polyol composition of claim 5 wherein said nitrogen-containing component is selected from the group consisting of secondary alkanolamines.

7. The polyol composition of claim 4 wherein said monohydroxy organic compound is selected from the group consisting of monohydric phenols.

8. The polyol composition of claim 4 wherein said second component has a molecular weight ($M_w$) or average molecular weight in the range 400 to 4,000.

9. The polyol composition of claim 4 wherein said at least one first component has a functionality of at least 3 and an OH number in the range 300 to 600.

10. The polyol composition of claim 4 wherein said at least one first component has a functionality in the range 3 to 5.

11. The polyol composition of claim 4 wherein said at least one second component has a functionality or average functionality of about 2.

12. The polyol composition of claim 4 wherein said second component is free of primary hydroxyl groups.

13. The polyol composition of claim 4 wherein said at least one second component is selected from the group consisting of propoxylated propylene glycol or propoxylated poly(propylene glycol).

14. The polyol composition of claim 4 wherein said at least one second component forms from 1 to 40% by weight of the mixture of the first and second components.

15. Insulation comprising polyurethane foam as claimed in claim 3.

16. Insulation comprising polyurethane foam as claimed in claim 4.

17. A laminate comprising a polyurethane foam core wherein the core comprises polyurethane foam as claimed in claim 3.

18. A method of obtaining a substantially closed cell rigid polyurethane foam by reaction of a polyol with a polyisocyanate in the presence of a blowing agent characterized in that the polyol comprises a composition having an overall functionality of more than two and comprising at least one first component (1) which is prepared by reacting alkylene oxide with an initiator having a functionality of more than 2, at least one aromatic ring, and at least one nitrogen atom, where the viscosity of the first component is in the range of 3,500 to 20,000 cps at about 25° C.; and at least one second component (2) selected from the group consisting of monohydroxy organic compounds, polyols, and mixtures thereof, said second component having a functionality or average functionality of at least two but less than 3 and a molecular weight ($M_w$) or average molecular weight in the range 250 to 4,000, said second component being free of polyester polyol and having a viscosity less than that of the first component at about 25° C., and water is the sole blowing agent.

19. The method of claim 18 wherein the polyisocyanate comprises polymethylene polyphenyl isocyanate having a functionality in the range 2.1 to 3.2 and an equivalent weight in the range 120 to 180.

20. The method of claim 18 wherein water is used in an amount in the range 1% to 5% by weight, based on the weight of polyol, to give a foam having a density of 50 kg/m³ or less.

21. A laminate comprising a polyurethane foam core in which the polyurethane foam is a closed cell rigid polyurethane foam made using water as the sole blowing agent, which polyurethane foam is prepared from a polyol composition having a functionality greater than 2, and consisting of at least one first component (1) which is prepared by reacting alkylene oxide with an initiator having a functionality of more than 2, at least one aromatic ring, and at least one amino nitrogen atom, where the viscosity of the first component is in the range of 3,500 to 20,000 cps at about 25° C.; and at least one second component (2) selected from the group consisting of alkoxylated monohydroxy organic compounds, polyols, and mixtures thereof, said second component having a functionality or average functionality of at least 1 but less than 3 and a molecular weight ($M_w$) or average molecular weight in the range of 250 to 4,000, said second component being free of polyester polyol and having a viscosity less than that of the first component at about 25° C.; and which closed cell rigid polyurethane foam is scorch-free and has a density not greater than about 50 kg/m³.

22. A closed cell rigid polyurethane foam which is scorch-free and has a density of not greater than 50 kg/m³ and is prepared using water as the sole blowing agent and from a polyol composition having a functionality greater than 2, and consisting of at least one first component (1) which is prepared by reacting alkylene oxide with an initiator comprising a Mannich condensation product of at least one phenolic compound, formaldehyde, and a nitrogen-containing component selected from the group consisting of ammonia, alkanolamines and mixtures thereof, where the viscosity of the first component is in the range of 3,500 to 20,000 cps at about 25° C.; and at least one second component (2) selected from the group consisting of alkoxylated monohydroxy organic compounds, polyols, and mixtures thereof, said second component having a functionality or average functionality of at least 1 but less than 3 and a molecular weight ($M_w$) or average molecular weight in the range of 250 to 4,000, said second component being free of polyester polyol and having a viscosity less than that of the first component at about 25° C.

23. A polyol composition suitable for use in the production of polyurethane foam, said composition having a functionality greater than 2, and consisting of at least one first component (1) which is prepared by reacting alkylene oxide with an initiator having a functionality of more than 2, at least one aromatic ring, and at least one amino nitrogen atom, wherein the at least one first component has a functionality of at least 3 and an OH number in the range 300 to 600, and 1 to 40% by weight of at least one second component (2) selected from the group consisting of alkoxylated monohydroxy organic compounds, polyols, and mixtures thereof, said second component having a functionality or average functionality of at least 1 but less than 3 and a molecular weight ($M_w$) or average molecular weight in the range of 250 to 4,000, wherein the second component is free of primary hydroxyl groups and free of polyester polyol.

* * * * *